United States Patent
Seito et al.

(10) Patent No.: US 11,365,038 B2
(45) Date of Patent: Jun. 21, 2022

(54) PACKAGING MATERIAL

(71) Applicant: TOYO SEIKAN GROUP HOLDINGS, LTD., Tokyo (JP)

(72) Inventors: Shinya Seito, Yokohama (JP); Takayuki Ishihara, Yokohama (JP); Saya Sugioka, Yokohama (JP); Kousuke Ueda, Yokohama (JP); Kota Okamoto, Yokohama (JP)

(73) Assignee: TOYO SEIKAN GROUP HOLDINGS. LTD., Tokyo (JP)

( * ) Notice: Subject to any disclaimer, the term of this patent is extended or adjusted under 35 U.S.C. 154(b) by 253 days.

(21) Appl. No.: 16/605,396

(22) PCT Filed: Apr. 19, 2018

(86) PCT No.: PCT/JP2018/016171
§ 371 (c)(1),
(2) Date: Oct. 15, 2019

(87) PCT Pub. No.: WO2018/194128
PCT Pub. Date: Oct. 25, 2018

(65) Prior Publication Data
US 2021/0300650 A1    Sep. 30, 2021

(30) Foreign Application Priority Data
Apr. 20, 2017  (JP) .............................. JP2017-083665

(51) Int. Cl.
*B65D 65/38* (2006.01)
*C08J 5/18* (2006.01)

(52) U.S. Cl.
CPC ................ *B65D 65/38* (2013.01); *C08J 5/18* (2013.01); *C08J 2323/06* (2013.01); *C08J 2323/12* (2013.01); *C08J 2367/02* (2013.01)

(58) Field of Classification Search
CPC ......... B32B 27/36; B32B 15/08; B32B 15/09; B32B 2307/538; B32B 27/32; B65D 65/38; C08J 5/18; C08J 2323/06; C08J 2323/12; C08J 2367/02
See application file for complete search history.

(56) References Cited

U.S. PATENT DOCUMENTS

2018/0257817 A1   9/2018  Iwasaki et al.

FOREIGN PATENT DOCUMENTS

| EP | 1 174 457 A1 | 1/2002 |
|----|---|---|
| JP | 2-175248 A | 7/1990 |
| JP | 2004-284315 A | 10/2004 |
| JP | 2006-046854 A | 2/2006 |
| JP | 2016-013666 A | 1/2016 |
| JP | 2016-141437 A | 8/2016 |
| JP | 2016-150769 A | 8/2016 |
| WO | 2015/163450 A1 | 10/2015 |
| WO | 2016/067875 A1 | 5/2016 |

OTHER PUBLICATIONS

Extended European Search Report dated Jan. 21, 2021 in European Application No. 18788424.2.
International Search Report of PCT/JP2018/016171 dated Jun. 26, 2018 [PCT/ISA/210].

*Primary Examiner* — Yan Lan
(74) *Attorney, Agent, or Firm* — Sughrue Mion, PLLC

(57) ABSTRACT

A packaging material having a contact surface formed of a thermoplastic resin that is adapted for contacting a viscous content. The contact surface is a mirror surface having a roughness Sa of not more than 100 nm and a water contact angle of not less than 60° C. at 20° C.

4 Claims, No Drawings

PACKAGING MATERIAL

CROSS REFERENCE TO RELATED APPLICATIONS

This application is a National Stage of International Application No. PCT/JP2018/016171, filed Apr. 19, 2018, claiming priority to Japanese Patent Application No. 2017-083665, filed Apr. 20, 2017.

TECHNICAL FIELD

The present invention relates to a packaging material having a mirror surface as a contact surface to come in contact with a content.

BACKGROUND ART

A container to contain a liquid content is required to have slidability with respect to a content therein. In a case of containing a less viscous liquid like water, any particularly high slidability may not be required. However, a viscous and thick content such as cosmetics to be used after shampooing, e.g., a hair rinse, a hair conditioner and a hair treatment, the content may be much less likely to slide down whether the container is made of a plastic or glass. The content may not be discharged rapidly even when the container is inclined. The content cannot be used up since it may adhere to the container wall and remain within the container.

In order to solve the problems, Patent document 1 discloses a heat-seal resin film having a surface with a rugged structure. The rugged structure is formed by shaping with a roll having the rugged structure thereon. The resin film has a surface roughness Sa in a range of 0.1 to 10 µm. The film in Patent document 1 is applied to a packaging bag such that the surface with the rugged structure would make the innermost surface. The content may be less likely to adhere or remain on the inner surface of the packaging bag.

However, the slidability of the film of Patent document 1 may deteriorate considerably when the content enters the rugged surface, and this may cause a problem of adherence and remaining of the content. This may be a serious obstacle in application of packaging materials like pouches to be filled with contents and then stored for a long period of time.

Patent document 2 discloses a coating film to be formed on a surface of a functional apparatus such as a heat exchanger. The coating film of Patent document 2 is a smooth planing coat having a surface with a centerline average roughness of Ra=0.1 µm or less as defined in JIS B0601. However, the coat of Patent document 2 is obtained by applying a coating liquid of a special composition on the surface of the functional apparatus and baking it. This requires a complicated process and may raise the cost for equipment and materials. In addition to that, the object suitable for the coating is limited, and thus, the coat is substantially not applicable to packaging materials.

PRIOR ART DOCUMENTS

Patent Documents

[Patent Document 1] JP 2016-150769 A
[Patent Document 2] JP 2006-46854 A

SUMMARY OF THE INVENTION

Problems to be Solved by the Invention

Therefore, an object of the present invention is to provide a packaging material capable of exhibiting excellent slidability by simple means.

Means for Solving the Problems

The present invention provides a packaging material having a contact surface that is formed of a thermoplastic resin to come in contact with a viscous content. The contact surface is a mirror surface having a roughness Sa of not more than 100 nm, and it has a water contact angle of not less than 60° C. in a measurement at 20° C.

It is preferable for the packaging material of the present invention that:
(1) the viscous content has a viscosity of not less than 100 mPa·s in a measurement at 20° C.;
(2) the contact surface has a roughness Sa of less than 20 nm;
(3) the thermoplastic resin is either a polyolefin resin or a polyester resin; and
(4) the packaging material is a bag-type container.

Effects of the Invention

The packaging material of the present invention has an excellent slidability. In Examples below, even a hair conditioner as one of the less slidable contents completely slides down. The slidability is imparted by remarkably simple means of making the surface to come in contact with the content as a mirror surface having a high water repellency. This can decrease the number of process steps for production, and reduce the cost for equipment, materials and the like.

MODE FOR CARRYING OUT THE INVENTION

A notable feature of the packaging material of the present invention is that the surface to come in contact with contents comprises a mirror surface.

A mirror surface is a surface having a roughness Sa of not more than 100 nm, preferably not more than 50 nm, and more preferably less than 20 nm. The roughness Sa is called also arithmetic mean height Sa, which is a concept obtained by extending three-dimensionally the two-dimensional arithmetic mean roughness Ra defined in JIS B0601. Namely, it is a three-dimensional roughness parameter. Specifically, the roughness Sa is a value obtained by averaging the absolute value of the deviation from a reference surface to a designated surface, and it is represented by the equation below.

$$Sa = \frac{1}{S_0} \int_{Y_B}^{Y_T} \int_{X_L}^{X_R} |F(X, Y) - Z_0| dX dY \quad \text{[Equation 1]}$$

F(X, Y): surface indicated by all measurement data
$S_0$: area based on assumption that a designated surface is ideally flat
$Z_0$: average value of Z data within a designated surface As indicated in Comparative Examples 1, 2 below, when the value of roughness Sa is too large, i.e., when the contact surface is no longer a mirror surface, the excellent slidability cannot be obtained.

Another notable feature of the present invention is that the contact surface has a high water repellency, more specifically, a water contact angle of not less than 60° at 20° C. On the other hand, Comparative Example 3 illustrates that such an excellent slidability cannot be obtained when the water contact angle is too small.

Various embodiments can be employed in the present invention as long as the surface to come in contact with the content is a mirror surface having a water contact angle of not less than 60°. This will be described in detail below with reference to embodiments in the form of films.

The film of the embodiment has a substrate layer of a thermoplastic resin, and one of the surfaces of the substrate layer to come in contact with contents is a mirror surface having a high water repellency.

Examples of the thermoplastic resin include:

polyolefin resins such as a random or block copolymer or a cyclic olefin copolymer of α-olefins like low-density polyethylene, high-density polyethylene, polypropylene, poly1-butene, poly4-methyl-1-pentene or ethylene, propylene, 1-butene, and 4-methyl-1-pentene;

ethylene.vinyl copolymers such as ethylene.vinyl acetate copolymer, ethylene.vinyl alcohol copolymer, and ethylene•vinyl chloride copolymer;

styrene resins such as polystyrene, acrylonitrile•styrene copolymer, ABS, and α-methylstyrene.styrene copolymer;

vinyl resins such as polyvinyl chloride, polyvinylidene chloride, vinyl chloride.vinylidene chloride copolymer, methyl polyacrylate, and poly methyl methacrylate;

polyamide resins such as nylon 6, nylon 6-6, nylon 6-10, nylon 11, and nylon 12;

polyester resins such as polyethylene terephthalate (PET), polybutylene terephthalate, polyethylene naphthalate, and copolyesters thereof;

polycarbonate resins;

polyetheretherketone resins;

polyphenylene oxide resins; and biodegradable resins such as polylactic acid.

These can be used alone or at least two of them can be blended in use as long as the moldability is not degraded.

Among the thermoplastic resins, the polyolefin resin or the polyester resin is preferred, and the polyolefin resin is particularly preferred, since there are few hydrophilic polar groups such as amide groups or hydroxyl groups included in the molecular chain, and thus, the desired water contact angle will be easily obtained.

It is also possible to blend fatty acid amide, polyhydric alcohol, glycerin fatty acid ester, edible oil and fat, silicone oil, liquid paraffin, inorganic particles, metal oxide particles, and alumina, as long as the substances do not inhibit the actions, the effects and the functions of the present invention. It is also possible to add as required an anti-blocking agent, an antistatic agent, a coloring agent, a UV absorber, a heat stabilizer, a rubber, and any other resin. Further it is possible to add one or at least two kinds of compounding agents to the thermoplastic resin.

The substrate layer may have a monolayer structure or a laminate structure as a combination of layers comprising the aforementioned thermoplastic resins. Any other layer comprising a material such as a metal foil, glass and paper can be laminated further in addition to the substrate layer for the film of the present embodiment.

The average thickness of the film in the present embodiment can be determined suitably in accordance with the content or the like, and it is typically in a range of 1 to 500 μm.

The film of the present embodiment can be produced using the aforementioned materials and by any ordinary method such as a cast method, a T-die method, a calender method or an inflation method. In such a case, it is required to use a mold having a mirror surface or to adjust a stretch rate. The process for forming the mirror surface may be adopted suitably in accordance with factors such as the material compositions and the producing method. Adjustment of stretch rate is preferred since it does not require special equipment.

The film as the packaging material in the aforementioned embodiment can be replaced by any other embodiments. For instance, it may be provided as a package such as various bag-type containers, containers shaped as cups, trays or bottles, and their lids. Examples of the bag-type container include flat pouches sealed at three sides or four sides, gusset pouches, standing pouches, and pillow-package bags. The bag-type container is preferred since it enables storage for a long time after being filled with the contents, and thus, it can maximize the effects of the present invention.

The bag-type container can be manufactured by any known methods. For instance, a flat pouch can be produced by cutting the film of the aforementioned embodiment and sealing at three sides or four sides. A standing pouch can be produced by preparing two films as side films, and sealing the side films at the side sealing part and the bottom sealing part with a bottom film folded in two and interposed between the side films. The sealing can be conducted using an adhesive or by heating. In the present invention, the contact surface is not covered with a coating or the like, but it is kept as a mirror surface. Therefore, it can be sealed easily by heating.

A viscous water-containing content are less likely to slide down on a conventional packaging material. Experiments has clarified that the packaging material of the present invention exhibits a high slidability with respect to such a viscous water-containing content. For this reason, the content is preferably viscous. Specifically, it is preferred to have a viscosity of 100 mPa·s or more at 20° C. and contain moisture of 0.01% by weight or more. Examples of the content include mayonnaise, ketchup, honey, sauces, mustard, dressing, jam, chocolate syrup, curry sauce, thickened foods, gel-like products like pudding and yogurt, cosmetics such as milky lotion and liquid foundation, water-based glue, liquid detergent, and a hair-care product such as a shampoo, a hair rinse, a hair conditioner and a hair treatment. Experiments further have demonstrated that the slidability is increased as the viscosity becomes higher. Therefore, the most preferred contents are the hair rinse, the hair conditioner and the hair treatment, since they are highly viscous, namely, they have viscosity of 500 mPa·s or higher, or particularly 1000 mPa·s or higher at 20° C.

EXAMPLES

The present invention will be described with reference to Examples.

<Measurement Methods>

Water Contact Angle

3 μL of water was dropped on a contact surface of a substrate, and a measurement was conducted at 20° C. and 50% RH using a contact angle meter (DropMaster700 manufactured by Kyowa Interface Science, Inc.).

Surface Roughness

The substrate was cut into pieces of 7 mm×7 mm for measuring the roughness Sa in an area of 50 μm×50 μm using a scanning probe microscopic system (environmental control unit AFM5300E manufactured by Hitachi High-Technologies Corporation). The measurement conditions are described below.

Cantilever: resonant frequency $f_0$=23-31 kHz
Spring constant k=1.9 N/m
Measurement mode: contact mode
Scan rate: 0.53 Hz
Scan range: 50 μm×50 μm
Scan line number: 256

From the thus obtained 3D data, the roughness Sa was calculated using software (AFM5000II) included in the scanning probe microscopic system. The roughness Sa is a value obtained by averaging the absolute value of the deviation from the reference surface to a designated surface, and it is represented by the equation below.

$$Sa = \frac{1}{S_0} \int_{Y_B}^{Y_T} \int_{X_L}^{X_R} |F(X,Y) - Z_0| dXdY \quad \text{[Equation 2]}$$

F(X,Y): surface indicated by all measurement data
$S_0$: area based on assumption that a designated surface is ideally flat
$Z_0$: average value of Z date within a designated surface
Slidability evaluation The substrates (80 mm×80 mm) shown in Table 1 were attached onto aluminum plates that were then immersed vertically in Conditioner-A (1600 mPa·s) or Conditioner-B (940 mPa·s) and sealed. Later, they were stored at room temperature (20° C.) for three days. The viscosity was measured using a sine-wave vibro viscometer (SV-10 manufactured by A&D Company, Limited) under a condition of 20° C. The plates with the substrates were pulled up vertically at about 3 cm/s in a room temperature to observe that the conditioners sliding down on the substrate surface. The plates were observed after 5 minutes, and the slidability of the conditioner was evaluated based on the following criteria.

Very good: 80% by weight or more of the conditioner adhering to the substrate surface slides down just after pulling up the plate.
Good: 50% by weight or more and less than 80% by weight of the conditioner adhering to the substrate surface slides down just after pulling up the plate.
Bad: Less than 50% by weight of the conditioner adhering to the substrate surface slides down just after pulling up the plate.

Example 1

The surface roughness and the contact angle of a biaxially stretched polypropylene film (OPP film) were measured by the aforementioned method. Then, the slidability of the Conditioner-A was evaluated by the aforementioned method. The results of the evaluation and measurement are shown in Table 1.

Example 2

The measurements and evaluations were conducted similarly to Example 1 except that the OPP film was replaced by a low-density polyethylene plate (PE plate). The results are shown in Table 1.

Example 3

The measurements and evaluations were conducted similarly to Example 1 except that the OPP film was replaced by a biaxially-stretched polyethylene terephthalate film (PET film). The results are shown in Table 1.

Example 4

The measurements and evaluations were conducted similarly to Example 1 except that the OPP film was replaced by an unstretched isophthalic acid modified polyethylene terephthalate film (PETI film) prepared by copolymerizing ethylene terephthalate with 12.5 mol % of isophthalic acid. The results are shown in Table 1.

Example 5

The measurements and evaluations were conducted similarly to Example 3 except that the Conditioner-A was replaced by Conditioner-B different in viscosity. The results are shown in Table 1.

Comparative Example 1

The measurements and evaluations were conducted similarly to Example 1 except that the OPP film was replaced by an unstretched polypropylene film (CPP film). The results are shown in Table 1.

Comparative Example 2

The measurements and evaluations were conducted similarly to Example 1 except that the OPP film was replaced by a biaxially-stretched polyethylene terephthalate film (PET (WA1000) film) that had been sand-blasted with white fused alumina having an average particle diameter of 11.5 μm (WA1000). The results are shown in Table 1.

Comparative Example 3

The measurements and evaluations were conducted similarly to Example 1 except that the OPP film was replaced by a biaxially-stretched nylon film (Ny film). The results are shown in Table 1.

TABLE 1

| | Substrate | | Conditioner | | |
|---|---|---|---|---|---|
| | Type | Surface roughness (Sa) | Water contact angle (°) | Type | Viscosity (mPa·s) | Slidability evaluation |
| Ex.1 | OPP film | 9.9 | 106.8 | A | 1600 | Very good |
| Ex.2 | PE plate | 21.1 | 101.9 | A | 1600 | Good |
| Ex.3 | PET film | 8.3 | 79.9 | A | 1600 | Very good |
| Ex.4 | PETI film | 36.7 | 68.4 | A | 1600 | Good |
| Ex.5 | PET film | 8.3 | 79.9 | B | 940 | Good |
| Com. Ex.1 | CPP film | 129.7 | 103 | A | 1600 | Bad |
| Com. Ex.2 | PET (WA1000) film | 112.2 | 85.1 | A | 1600 | Bad |
| Com. Ex.3 | Ny film | 8.3 | 46.14 | A | 1600 | Bad |

*Ex.: Example
Com. Ex.: Comparative Example

The evaluation results shown in Table 1 indicates that the slidability evaluation results were favorable for the substrates in Examples 1-4 where the substrates had a water contact angle of not less than 60° and roughness Sa of not more than 100 nm. The same results were particularly favorable for the substrates in Examples 1 and 3 where the roughness Sa was less than 20 nm. In contrast, the slidability evaluation results were inferior in Comparative Examples 1 and 2 where the water contact angle was not less than 60° but the roughness Sa was more than 100 nm. The slidability was bad in Comparative Example 3 where the substrate in use had roughness Sa of less than 20 nm but the water contact angle of less than 60°. These results indicate that a substrate having a roughness Sa of not more than 100 nm and a water contact angle of not less than 60° is preferred. In Example 5, a substrate having a water contact angle of not less than 60° and a roughness Sa of not more than 100 nm was used while Conditioner-A was replaced by the less viscous Conditioner-B. The slidability in Example 5 was favorable, but slightly inferior to that of Example 3. This indicates that a content of higher viscosity slides down more easily.

The invention claimed is:

1. A packaging material having a contact surface that is formed of a thermoplastic resin,
    the packaging material is a pouch obtained by adhering a film together,
    the contact surface is an inner surface of the pouch to which a viscous content comes into contact with, and
    the contact surface has a mirror surface having a roughness Sa of less than 20 nm and a water contact angle of not less than 60° in a measurement at 20° C.

2. The packaging material according to claim 1, wherein the viscous content has a viscosity of not less than 100 mPa s in a measurement at 20° C.

3. The packaging material according to claim 1, wherein the thermoplastic resin is a polyolefin resin.

4. The packaging material according to claim 1, which is a bag-type container.

* * * * *